R. L. MUNSON.
CONTROLLER FOR ELECTRIC MOTORS.
APPLICATION FILED FEB. 11, 1908.
912,871.
Patented Feb. 16, 1909
3 SHEETS—SHEET 1
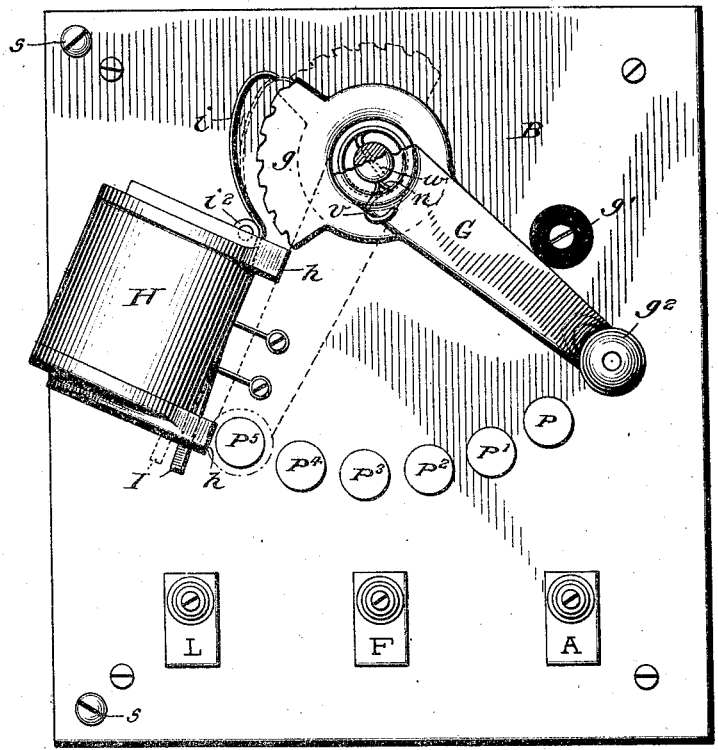
Fig. 1.
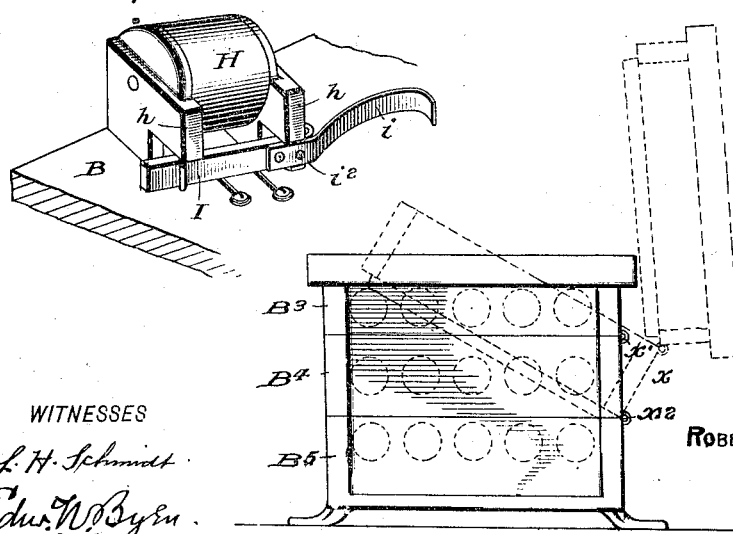
Fig. 4.
Fig. 6.
WITNESSES
L. H. Schmidt
Edw. W. Byrn.
INVENTOR
ROBERT L. MUNSON,
BY Munn&Co.
ATTORNEYS

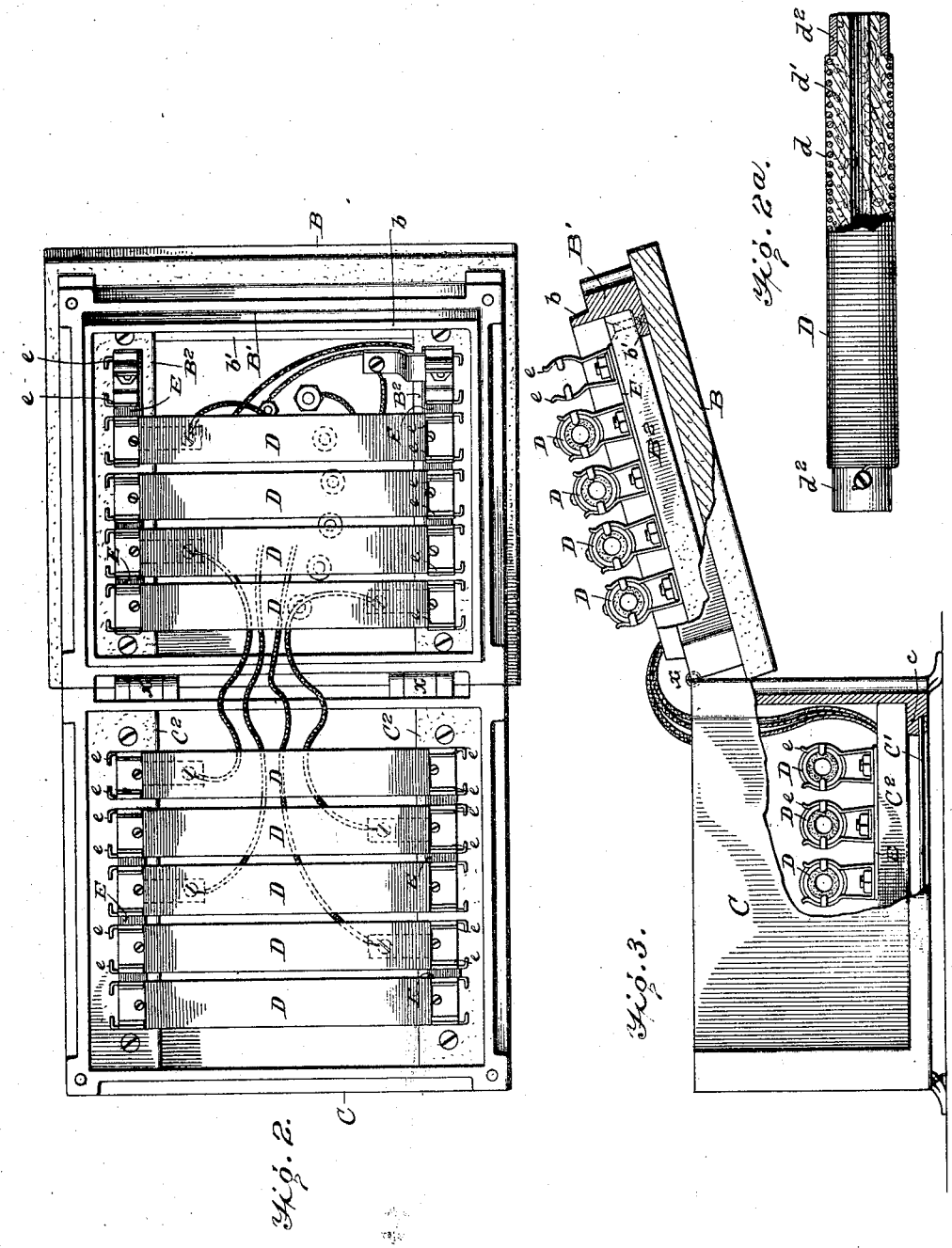

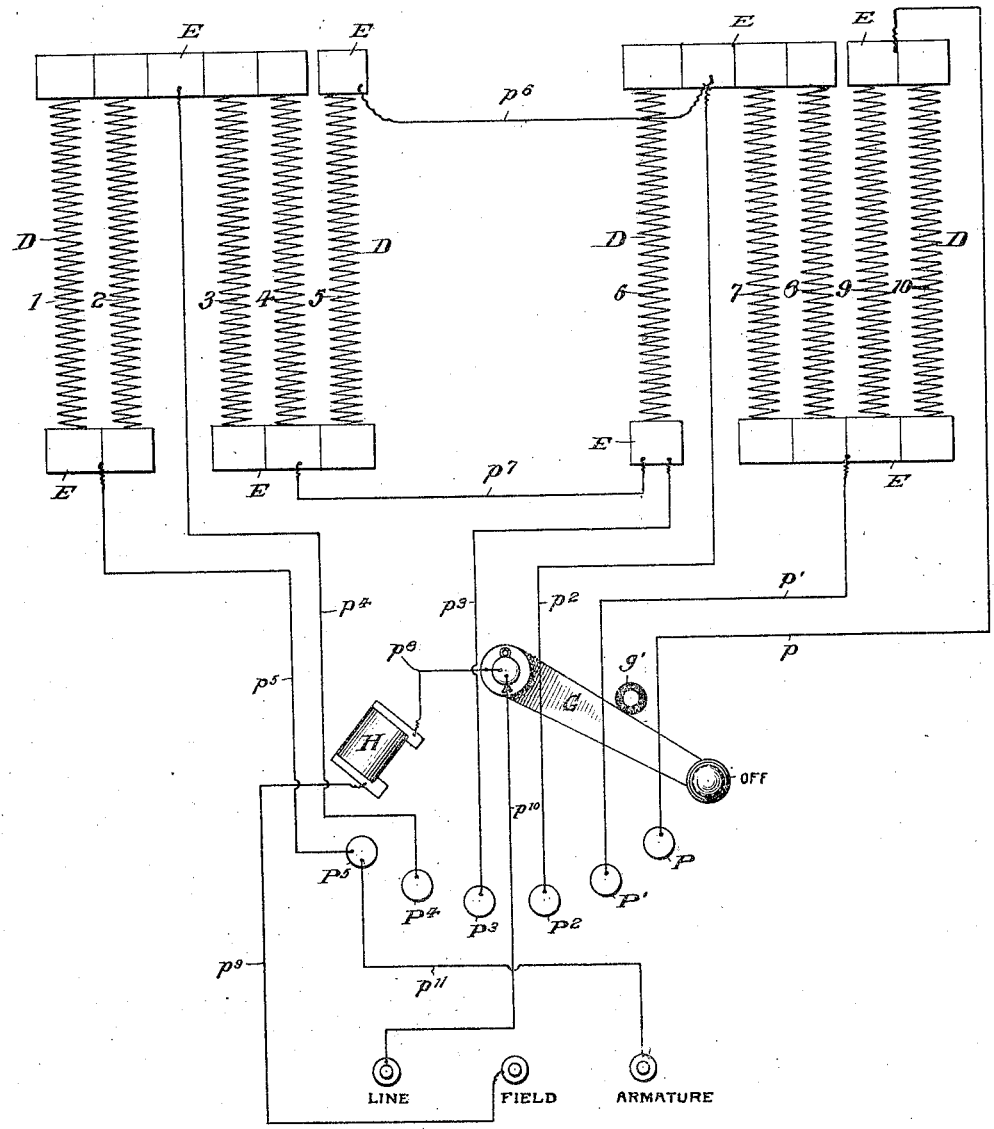

UNITED STATES PATENT OFFICE.

ROBERT LEONIDAS MUNSON, OF SEATTLE, WASHINGTON.

CONTROLLER FOR ELECTRIC MOTORS.

No. 912,871.   Specification of Letters Patent.   Patented Feb. 16, 1909.

Application filed February 11, 1908. Serial No. 415,299.

*To all whom it may concern:*

Be it known that I, ROBERT LEONIDAS MUNSON, a citizen of the United States, and a resident of Seattle, in the county of King and State of Washington, have made certain new and useful Improvements in Controllers for Electric Motors, of which the following is a specification.

My invention is in the nature of an improved controller for electric motors and especially of that form of controller of compact limits and portable character known as starting-boxes, the same being also capable of use as "phase splitters".

One object of my invention is to provide a starting box which can be made either dust proof or of ventilated pattern in which easy access may be had to the resistance coils for conveniently inspecting, repairing or replacing the same.

A further object is to have a box so constructed that the coils can be wound on cores with contact ends on the cores so that they can be removed and replaced at will without disturbing the rest of the box and in which the box is provided with spring clips, sockets or clamps in which the coils may be detachably seated and removed and replaced, the same as a no-arc fuse, in case the coils are burned out, without having to loosen any of the connections.

To these ends my invention consists in the novel construction and arrangement of the box and its associated parts as will be hereinafter fully described with reference to the drawing in which—

Figure 1 is a top plan view of the starting box or controller. Fig. 2 is a top plan view with the box opened and one of the coils removed. Fig. 2ª is a detail partly in section of one of the resistance coils. Fig. 3 is a sectional end view of the box open. Fig. 4 is a perspective detail of the holding magnet for the controller arm. Fig. 5 is a diagram illustrating the circuit connections of the coils and contacts, and Fig. 6 is an end view of a modified form of starting box adapted to receive a large number of resistance coils.

Referring to Figs. 2 and 3 it will be seen that the box resembles the old boxes now in use in its outside appearance, but is made in two parts, the upper part B being hinged to the lower part C at the points $x$, so that said upper part may be turned back upon said hinges to expose the interior of the box. The upper part B consists of a slate surface connected to a marginal metallic frame B' which carries the hinges and the slate surface as seen in Fig. 1 has the usual controller handle G with curved insulated series of contact points P, P', $P^2$, $P^3$, $P^4$, $P^5$, holding magnet H for the controller handle and binding posts L, F A, for the connecting wires leading respectively to the line, field magnets, and armature.

The bottom part of the box may be made solid with the sides or it may be made open and provided with flanges $c$ to which is fitted, as shown in Fig. 3, a detachable bottom plate C'. This plate C' serves to close in the bottom part of the box and to render the same dust-proof.

The top portion of the box is formed with a rabbet around the edge of the same, leaving a flange $b$ along its inner edge which when the cover is turned down enters the interior of the box for the purpose of making a tight joint to render the box dust-proof and fire-proof in case the coils should burn out. The two portions of the box which are hinged together at $x$ are secured in closed position by means of catches or two screws $s\ s$, as seen in Fig. 1, thus holding the joints of the box close and making a neat dust- and fire- proof box. If it is desired to make ventilated boxes, they are formed with holes or slots in the sides thereof in the ordinary way.

The box is provided with any number of detachable resistance coils D. In some cases these resistance coils will be placed only in the hinged cover of the box as shown on the right of Figs. 2 and 3, in which case the box may be made very shallow. In other cases the box will be made with resistance coils attached both to the cover and located inside of the box as seen in Figs. 2 and 3, while for very large motors there may be one or more central hinged frames arranged in the middle of the box, as seen in Fig. 6, in which $B^3$ represents the hinged top cover, $B^5$ the base portion of the box and $B^4$ the intermediate frame, which parts form horizontal sections of the box of equal cross section and are hinged together at the points $x'$ and $x^2$ so as to be turned up as shown in dotted lines to expose the coils. On the intermediate frame $B^4$ there may be placed either one set of coils as shown in dotted lines, or there may be two sets of coils which may be exposed on both sides by turning said section on its hinges $x^2$. In the top of the box, as seen in Fig. 3, there is arranged on opposite sides, non-conducting strips $B^2$ of slate or other insulating material, which are screwed to the flange $b'$ of the marginal frame. In like manner slate strips $C^2$ are secured within the box upon the flange $c$ and these slate strips have metallic plates E screwed to the same, which plates also carry any suitable number of socket spring clips $e\ e$ into which are detachably inserted the resistance coils D. The connections between these spring clips are made by means of the brass strips E, upon which they rest, the spring clips being arranged in such groups on the plates E as to permit the current to pass through the resistance coils in any desired manner. As shown in the diagram Fig. 5, my box is arranged to be connected up in parallel, or in other words, the current is passed through two coils at a time and therefore for each point of advance for the controller arm G, two coils are cut out until all of the resistance of the box is cut out of the circuit.

The controller arm G, see Fig. 1, is provided with a spiral spring $v$, one end of which is connected to the controller arm and the other to a stationary post of the box, so that its tension will normally hold the controller arm G against the insulation stop $g'$. When, however, the controller arm is moved by means of its handle $g^2$, over the contacts $P-P^5$, it may be stopped upon any one of said contacts and for this purpose the controller arm is formed with the segmental notch plate $q$, into the notches of which a spring pawl $i$ is arranged to enter and hold said controller arm to its position, the spring pawl $i$ being an extension of an armature bar I, pivoted at $i^2$. This armature bar I is under the influence of the attraction of the laterally extended pole pieces $h\ h$ of an electro-magnet H, which is permanently in the path of the circuit to the field magnets. This electro-magnet has its polar axis parallel to the radial line of the controller arm when thrown to its extreme position. The upper portions of the pole piece extensions $h\ h$ are carried beyond the range of the armature I as seen in Fig. 4 for the purpose of alinement with the edge of the iron arm G of the controller, so that when the controller arm G is thrown to its extreme position to the left of Fig. 1, as shown in dotted lines, the attractive influence of the pole pieces $h\ h$ upon the controller arm G will hold it in said position. This is done to allow the box to be used as a starting box in case the spring on the armature becomes broken or fails to hold in the notches and in this way the motor is prevented from being put out of commission. When the controller is used as a starting box the spring pawl and the notches may be omitted and the magnet only will be used, in which case the handled arm must not be released until it rests against the magnet poles to be retained thereby. The spring V that turns the controller handle back to its "off" point is a spiral spring and one end is put in a hole that has been drilled in the post $w$ and the other end is hooked behind the handle bar in such a way that as soon as the magnet releases the handle bar the spring will return the handle bar to the "off" position. The post $w$ upon which the handle bar turns, has a hole at the top through which a cotter pin $n$ is passed to hold the handle on. Under the handle arm G there is placed the usual bearing spring of metal for making contact with the contact points $P-P^5$.

The general type of boxes will for the most part have three binding posts on them as shown at L, F, A, in Fig. 1, for line, field and armature respectively, although some boxes will have more or less according to the purpose for which they are intended. Thus for instance, in the case of a "phase splitter", there would be fewer contact points and more binding posts. It also depends upon the number of resistance coils and how they are connected up and as to how many contact points there will be on the box. If desired, the top from any old box can be used in connection with my invention.

The connections are made from the under side of the slate top from each contact point to a screw on the end of a lug which is fastened to the spring clamp or its base plate.

The resistance coils, see Fig. $2^a$, are formed of tubes of asbestos $d'$, wound with wire $d$ having at the ends thereof metallic collars $d^2$, $d^2$, which are respectively connected to the opposite ends of the wire coil $d$ whose convolutions are insulated from each other. When one of these resistance coils is placed within the socket clips $e\ e$ at each end of the box the current from the socket clips $e\ e$ at one end coming in contact with the collars $d^2$ of the resistance coil, pass thence through the wire coil $d$ to the collar $d^2$ at the opposite end and thence to the socket clip and its base plate at this other end. The metallic collar at the ends of the resistance coils form permanent connections with the wire coils, which are not liable to become disconnected by any expansion and rotary movement of the wire when heated and these collars are made as wide cylindrical bands extending a considerable distance along the resistance unit with perfectly smooth external peripheries forming substantial friction bearings that may be conveniently thrust laterally in between and removed from the spring clips. The hollow ends of the asbestos cores, being wholly unobstructed, form seats into which a hook may be inserted between the spring clips so as to pull out the coils from between the two members of the clips even when the latter are very close to the side walls of the box.

By this construction the connections are not disturbed when the connections are burned out as in the old box and it does not take an expert to repair them, as the box may be repaired in five minutes by removing the old coil and replacing it with a new one in an easy and convenient manner. If there happens to be no extra coils on hand, one or more of the coils at the beginning of the series may be removed and be placed in the sockets of the burned out coils, thus allowing the motor to be operated until more coils can be had.

As before stated the resistance coils in my controller box are arranged as shown in Fig. 5 in parallel, that is to say, the current passes simultaneously through the two coils 1 and 2; thence through 3 and 4; thence through 5 and 6, thence through 7 and 8 and thence through 9 and 10. As shown in this diagram the controller arm G is in the "off" position. When advanced to the contact P, the current from the line passes through wire $p^{10}$, to the controller arm and thence divides going through all the resistance coils as follows. From the contact P, wire $p$, clamp plate E, pair of coils 9, 10, and thence successively through pairs 7—8, 5—6, 3—4 and 1—2, the wire $p^5$, contact $P^5$, wire $p^{11}$ to the armature. The line current from the controller handle also passes through the wire $p^8$ and $p^9$ and the electro-magnet H, to the field. When the controller handle is next advanced to the contact $P'$ the armature current follows the same path except that the resistance coils 9 and 10 are cut out; when the controller handle is advanced to the contact point $P^2$, coils 7 and 8 are cut out; when it advances to the contact point $P^3$ coils 5 and 6 are cut out; when it advances to the contact point $P^4$ coils 3 and 4 are cut out; and when it advances to the contact point $P^5$ the coils 1 and 2 are cut out, which cuts out the entire resistance of the box, and the current then flows from line to the controller handle through the wire $p^{10}$ and thence through controller arm to the contact $P^5$ and thence directly to the armature through wire $p^{11}$.

I claim—

1. A controller box having a hinged cover and provided with parallel series of spring socket clips, one series of clips being carried by said cover, and detachable resistance coils mounted in said socket clips parallel to the hinged cover and arranged to be exposed by turning back the cover.

2. A controller box having a hinged cover and provided in both the body of the box, and on its cover with two parallel series of spring socket clips, and detachable resistance coils mounted in said socket clips in parallel position to the cover and the bottom of the box, and arranged to be exposed by turning back the cover.

3. A controller box having a hinged cover provided with socket clips and detachable resistance coils mounted in said socket clips arranged to be exposed by turning back the cover, and a body portion having socket clips with detachable coils arranged therein, and circuit wires connecting the coils in the box with the coils on the cover.

4. A resistance box provided with a hinged cover and having two series of pairs of spring clips adapted to receive detachable coils, one of said series being attached to the cover and the other being disposed in the body of the box, an insulating support for said clips and detachable coils arranged with conducting collars at the end of broad cylindrical peripheries adapted to be forced between and held in contact with the clips.

5. An electric resistance box consisting of a plurality of equal cross sections hinged together, each section being provided with socket clips and detachable resistance coils arranged to be exposed by the turning of the sections back on their hinges.

ROBERT LEONIDAS MUNSON.

Witnesses:
ROLAND M. VALLET,
FRANK A. ROELL.